United States Patent Office 3,290,263
Patented Dec. 6, 1966

3,290,263
PROCESS OF REACTING SUGARS WITH REAGENTS WHEREIN THE SUGAR IS DISSOLVED IN MONOHYDRIC ALCOHOLS CONTAINING GROUPING

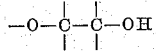

Bruce M. Smythe, Balgowlah, New South Wales, and Clarence J. Moye, Forestville, New South Wales, Australia, assignors to The Colonial Sugar Refining Company Limited, Sydney, New South Wales, Australia, a company of New South Wales, Australia
No Drawing. Original application Aug. 2, 1962, Ser. No. 214,216, now Patent No. 3,219,484, dated Nov. 23, 1965. Divided and this application Sept. 8, 1965, Ser. No. 485,921
Claims priority, application Australia, Aug. 7, 1961, 7,764/61
29 Claims. (Cl. 260—17.2)

This is a division of application Serial No. 214,216 filed August 2, 1962, now Patent Number 3,219,484.

This invention relates to a new process for the reactions of various monosaccharides and oligosaccorides, and their derivatives.

Methods are known for the carrying out of sugar reactions involving the use of such solvents as water, basic nitrogenous heterocyclic compounds, certain substituted amides (for example N,N-dimethyl formamide), dimethyl sulphoxide and γ-butyrolactone. Each of these solvents has inherent drawbacks of a chemical or economic nature. Thus, the scope of sugar reactions is severely limited in aqueous solutions, as the variety of reagents one can use in such solutions is very small and the stability of sucrose is also poor in aqueous solutions at elevated temperatures. Basic nitrogen heterocyclic compounds cannot be used in reactions involving the use of acids. They, as well as substituted amides and dimethyl sulphoxide are also very expensive as solvents for most industrial applications and γ-butyrolactone is susceptible to attack by alkaline reagents. Sugars such as sucrose also decompose at higher temperatures in γ-butyrolactone.

A further disadvantage in the use of aqueous solutions of sugars, is that sugars tend to decompose in aqueous solutions, particularly at high temperatures. For example, sucrose undergoes autocatalytic decomposition, particularly above 80 degrees centigrade with the formation of reducing sugars and coloured decomposition products. The rate of decomposition is increased by the hydrogen ion concentration of the medium, and even in pure water the hydrogen ion concentration is sufficient to produce decomposition. This instability of sucrose leads to the formation of undesirable by-products in various reactions involving sucrose. The stability of other sugars in aqueous solutions is also dependent on temperature and hydrogen or hydroxyl ion concentration.

These various disadvantages in the reactions of sugars and their derivatives can be overcome according to the invention by a process using certain substantially anhydrous, water-miscible high-boiling alcohols as solvents for the sugars. It has been found that, while most sugars or their derivatives are not very soluble in alcohols such as methanol and ethanol, their solubility is considerably higher in a monohydric alcohol containing the structural grouping

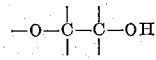

The gylcols, for example, ethylene glycol, contain the above-mentioned structure and generally dissolve sugars and their derivatives readily. However, they are rather viscous solvents and form with sugars very viscous solutions which present some of the difficulties encountered with aqueous solutions.

Solvents having the abovementioned structural grouping and having much greater utility as solvents for sugars and their derivatives include derivatives of glycols such as ethylene glycol monoalkyl ethers, ethylene glycol monoesters, diethylene glycol monoalkyl ethers and diethylene glycol monoesters. Furfuryl alcohol types, tetrahydrofurfuryl alcohol types, and 2-hydroxymethyl tetrahydropyran types are also examples of types of molecules which contain the above-mentioned structure and which are useful solvents for sugars and their derivatives. These alcohols generally have a lower viscosity and form less viscous solutions with sugars than do the glycols.

Most of these alcohols are miscible with water in all proportions, even when their boiling point is as high as 200 degrees centigrade, whereas the simple alcohols beyond propyl alcohol are only partially soluble. It is believed that the above structure allows the two oxygen atoms to be the correct distance apart for hydrogen bonding with the two hydrogens of the water molecule, leading to miscibility of these alcohols containing the structure of $$-O-\overset{|}{C}-\overset{|}{C}-OH$$

with water.

This structure is also expected to facilitate hydrogen bonding between these alcohols and the hydroxyl groups of sugars, thus leading to greater solubility of sugars in high boiling alcohols of this type.

The temperature coefficient of solubility is greater than for aqueous solutions and this favours better recovery of the sugar or sugar products from these alcohols than from aqueous solutions.

The thermal stability of sugars in solvents of the type specified is greater than in aqueous solutions and thus in various reactions of sugars and their derivatives less undesirable decomposition products are formed.

Solubilities of sucrose have been determined in several of these alcohols and are compared with those in ethanol, aqueous ethanol and γ-butyrolactose in the following table. Generally the solubility of mono-saccharides is greater than that of sucrose at any specified temperature.

TABLE 1
[Solubility of sucrose (g./100 g. solvent)]

| Temperature, °C | 50 | 70 | 80 | 90 | 100 | 110 | 120 | 130 | 140 | 150 |
|---|---|---|---|---|---|---|---|---|---|---|
| Solvent: | | | | | | | | | | |
| Ethylene glycol monomethyl ether | | | 1.5 | 2.0 | 2.7 | 3.8 | 5.5 | 8.6 | 13.8 | |
| Tetrahydrofurfuryl alcohol | | | 1.3 | 1.8 | 2.6 | 3.6 | 5.2 | 8.0 | 12.7 | 20.0 |
| Diethylene glycol monomethyl ether | | | 0.8 | 1.0 | 1.4 | 1.9 | 2.7 | 4.0 | 5.8 | 9.0 |
| Ethanol | | | 0.5 | 0.72 | 1.05 | 1.55 | 2.25 | 3.6 | 5.6 | |
| γ-Butyrolactone | | | 0.05 | 0.03 | 0.26 | 0.5 | 1.0 | [1]3.0 | [1]7.8 | |
| 70% aqueous alcohol | 31.8 | 51.0 | 66.5 | 91.0 | 124.0 | [1]180.0 | | | | |

[1] Approximate values only, due to some decomposition of sucrose.

Rates of decomposition of sucrose in the various solvents in Table 1 were followed by heating solutions containing sufficient sucrose to saturate the solution at the particular temperature. Samples were taken at various time intervals and the extent of decomposition of sucrose was determined by two sensitive methods.

(1) Measurement of light absorbance of the various solutions in the ultra-violet region of the spectrum was compared with a reference solution containing the same amount of sucrose and the alcohol. The thermal decomposition of sucrose gives rise to, amongst other products, 5-hydroxymethylfurfural. This compound has a strong absorption maximum at 282.5 m$\mu$. Increase in absorbance at this wavelength is a very sensitive measure of sucrose decomposition.

(2) Paper chromatography of the solutions carried out in butanol-ethanol-water as the solvent followed by development with silver nitrate or p-anisidine phosphate. This method detects breakdown of sucrose to other sugars such as glucose and fructose.

The results of these investigations show that sucrose is less prone to decomposition at high temperatures in these anhydrous alcohols than in water, aqueous alcohol or $\gamma$-butyrolactone.

For example, in tetrahydrofurfuryl alcohol at 145 degrees centigrade there was no evidence of breakdown of sucrose to glucose, fructose or 5-hydroxymethylfurfural after heating for 6 hours.

In $\gamma$-butyrolactone at 120 degrees centigrade there was little evidence of decomposition of sucrose. However, at 130 degrees centigrade there was marked decomposition of sucrose to glucose and frustose and 5-hydroxymethylfurfural after heating for 6 hours.

In a 70 percent aqueous ethanol solution there was marked decomposition of sucrose after 6 hours heating at 110 degrees centigrade.

The decomposition of sucrose in solutions at high temperatures is autocatalytic due to the formation of acidic substances which accelerate the hydrolysis of sucrose. In the anhydrous alcohols which are the subject of this invention this initial hydrolysis, which leads to the formation of acids, is inhibited.

Furthermore, the lower solubility of sugars in these alcohols compared with water leads to lower viscosities and densities of the solutions, which facilitates such operations as heat and mass transfer, pumping and crystillization and the separation of crystal from mother liquor. The ease with which these operations can be effected is of importance in developing continuous reaction processes.

The higher stability of sugars in these solvents is important in processes using these solvents a media for carrying out various reactions on sugars, particularly sucrose.

It has generally been found that most sugars are soluble in all proportions in these solvents at temperatures above the melting point of the sugar. For example, fructose which has a melting point of 105 degrees centigrade is soluble in all proportions in ethylene glycol monomethyl ether at the boiling point of this solvent (124 degrees centigrade). On cooling these very concentrated solutions very viscous syrups result.

In general, the advantages to be gained from the use of the solvents which are the subject of this invention, in reactions involving sugars and their derivatives, are derived from their general stability to both acid and alkali, their general compatability with a wide number of reagents, the possibility of readily obtaining these solvents in an anhydrous state, their use at high temperature, making it possible to maintain the solutions at such high temperatures without too rapid decomposition of the sugars, and the obvious economic advantages of ready availability and cheapness. The high temperature advantages of these solvents also encompass their use in continuous processes without complex equipment. The general solubilising powers of these solvents also frequently overcome the disadvantage of catalyst inhibition by tar formation and deposition which occurs is aqueous solutions in particular.

Further to this, it is possible to carry out consecutive reactions in these solvents under appropriate conditions without isolation of the intermediates. Certain of these intermediates are themselves useful compounds, and may be isolated if required. When derived from other sources, or in a manner other than herein specified, such intermediate compounds may be reacted in the same manner as already indicated to produce the useful end-products derived from the consecutive reactions utilising sugars as raw materials.

Reactions of the following nature may be readily performed on the relevant carohydrate types in the solvents specified above.

While it is an object of the invention to reduce the water content of sugar/solvent mixtures to the greatest extent feasible, the presence of small amounts of water is sometimes necessary or unavoidable and does not detract from the usefulness of these solvents in carrying out certain of these reactions. The quantity of water which may be present in reaction mixtures according to the invention is less than 5 percent by weight. Such reactions are:

(A) Reactions involving the sugar (open chain) carbonyl function, for example

Reductions, reductive ammonolysis, hydrogenolysis, mercaptal formation, oxidation, formation of sulphur containing derivatives, reactions with amines.

Reactions involving the carbonyl functions of materials derived directly from sugars, such as dialdehydes derived by periodate oxidation of sugars, for example:

Alakaline condensation with paraffinc compounds containing the —$CHNO_2$ grouping.

Some of these reactions are described hereinafter by way of example. These examples are intended as an illustration and in no way restrict the use of these solvents as media for sugar reaction or reaction of sugar derivatives.

EXAMPLE 1

*Catalytic reduction*

D (+) glucose (4 g.) was dissolved in ethylene glycol monomethyl ether (35 ml.) at the boiling point and the solution cooled to approximately 80° C. by immersion in a bath maintained at this temperature. Raney nickel (1 g.) prepared according to Vogel "Practical Organic Chemistry" (1948) was added, and the sugar was reduced in the usual manner, either at atmospheric or under increased pressure.

On completion of the reduction, the reaction was filtered to remove the catalyst and the filtrate cooled to 0° C. The product crystallised out in almost quantitative yield. Heat reversible gel formation sometimes occurred but the use of techniques known in the art, such as the addition of small amounts of ether, warming and careful temperature control on re-cooling, readily overcame this difficulty.

The product, D-sorbitol hemi-hydrate, was characterised by its melting point (72–74° C.) which was undepressed on admixture with an authentic sample. Other catalytic methods of reduction well known in the art can also be used in conjunction with the sugar solvents referred to previously and the reduction is of general application to reducing sugars.

EXAMPLE 2

*Mercaptal formation*

D (+) glucose (1 g.) was dissolved in ethylene glycol monomethyl ether (1 ml.) containing concentrated hydrochloric acid (1 ml.; S.G.1.180) by shaking, and the solution was cooled to 0° C. n-butyl mercaptan (1 ml.) was added, and the resulting homogeneous mixture was shaken for 30 minutes, during which time it warmed to room temperature. Cooling and the addition of ice-water (2 ml.) gave a white precipitate of the required mercaptal in good yield.

Recrystallised once from water, the product had a melting point of 125.5–126.5° C.; ($\alpha_D^{20}$ —17.1) and analysed correctly for $C_{14}H_{28}O_6S_2$.

The above process is generally applicable to the preparation of other mercaptals, particularly where the mercaptan is relatively insoluble in water. In such cases one of the solvents referred to previously, is generally found to be a solvent for the mercaptan, and this allows homogeneous reaction to proceed.

EXAMPLE 3

Oxidation by bromine

Glucose (180 mg.) was dissolved in diethylene glycol monomethyl ether and treated with bromine (one molecular proportion) at 70° C. for 30 minutes. The product was obtained by precipitation with ether and after trituration with ether and chloroform was found by infra-red spectroscopy to be a mixture of compounds containing negligible starting material and having several well developed carbonyl peaks. It was determined that these carbonyl peaks belonged to the δ- and γ-lactones of D-gluconic acid, by comparison with spectra reported in the literature. It was also determined that a small amount of free acid was present. The mixture of acid and lactones was suitable without purification, for use in sequestering formulations.

This reaction appears to be readily adaptable to continuous operation by regenerating bromine electrolytically from the hydrobromic acid produced.

EXAMPLE 4

Nitromethane condensation with D-hydroxymethyl-D'methoxydiglycolic aldehyde

D - hydroxymethyl - D' - methoxydiglycolic aldehyde was dissolved in ethylene glycol monomethyl ether with warming, and the required amount of nitromethane added. The solution was cooled in an ice bath, and sodium betamethoxy ethoxide dissolved in ethylene glycol monomethyl ether was added dropwise with swirling. The mixture was left standing in an ice bath for fifteen minutes and then concentrated "in vacuo" at less than 20° C. to a viscous oil. On standing under vacuum, the sodium acinitro salt of the 3-nitro-3-deoxysugar was obtained as a pale yellow-orange powder.

The infra-red spectrum of this product was identical in all respects with that of the product from the standard procedure carried out in methanol. As the periodate oxidation (described in Example 5) may be carried out in any of the solvents containing the structure

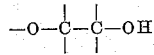

this procedure has an advantage over the procedure utilising methanol as the solvent. The nitromethane condensation may be carried out without the isolation of the periodate reaction product.

(B) Reactions involving adjacent —OH groups or groups separated by no more than one carbon atom, for example:

Carbonate formation, acetone-acetaldehyde reactions, periodate oxidations.

EXAMPLE 5

Periodate oxidation of α-methyl-D-glucopyranoside

α-Methyl-D-glucopyranoside was dissolved in ethylene glycol monomethyl ether with warming and the solution cooled to 0° C. Slightly more than two molar proportions of periodic acid were added over a period of 15 minutes with vigorous swirling at 0° C. and the solution was allowed to react at room temperature for 48 hours in the absence of light.

The reaction solution, which contained a fine white unidentified precipitate, was treated with sodium carbonate, shaken well and filtered.

Condensation with nitromethane as described in Example 4 could be affected without isolation of the product, but the identity of the product was confirmed by concentration to a light almost colourless oil which was found to have an infra-red spectrum identical in all respects with an authentic specimen of D-hydroxy-methyl-D'-methoxydiglycolic aldehyde.

(C) Dehydration reactions, for example:

Formation of 5-hydroxymethyl furfural, anhydrosugar formation.

Two examples of such reactions are given hereunder:

EXAMPLE 6

5-hydroxymethylfurfural

Fructose was dissolved in diethylene glycol monomethyl ether by warming above room temperature. Hydrochloric acid (1 molar equivalent of 10 N acid in diethylene glycol monomethyl ether) was added and the reaction carried out by heating to the boiling point for two seconds. The water content in the reaction mixture was less than 5% by weight. The reactions were quenched by adding an excess of distilled water, and the resultant aqueous solution was diluted for ultra-violet spectroscopic analysis. The yield of 5-hydroxymethylfurfural was 82%. Substitution of ethylene glycol monomethyl ether or tetra-hydrofurfuryl alcohol for the diethylene glycol monomethyl ether gave a similar result. Similar yields were also obtained when other mineral acids, or acidic catalysts such as sodium bisulphate, or Dowex 50 (registered trademark) resin in the acid form were substituted for the hydrochloric acid.

The use of organic acids as dehydration catalysts resulted in lower yields which are a reflection of acid strength, and proportionately longer reaction times must be employed. Concomitant production of the solvent 5-hydroxymethylfurfural ether results.

The use of kestose or inulin instead of fructose resulted in 70% yields while sorbose gave a 75% yield.

The use of sucrose gave a yield of 40%.

EXAMPLE 7

Preparation of anhydro-derivatives

A solution of erythritol (10 g.) in anhydrous tetra-hydrofurfuryl alcohol (100 ml.) and benzene (100 ml.) was refluxed in an entraining apparatus in the presence of an acid catalyst (for example, p-toluenesulphonic acid or prilled sodium bisulphate) (500 mg.), until water entrainment was complete.

The reaction solution could be vacuum distilled directly, but preferably was diluted with water and the product extracted and distilled. A good yield of a colourless oil (boiling point at 4 mm.—101–103° C.) was obtained, and this was characterised by its refractive index ($n_D^{20}=1.4707$) and the preparation of the di-p-nitrobenzoic derivative, M.P.—175.5–176.5° C. The product was 3,4-dihydroxy tetra-hydrofuran (erythran) and this was further confirmed by elemental analysis.

(D) Polymerisations involving the sugars or derived compounds, for example:

Sugars polymerised by Friedel-Craft's type catalysts, ammonium persulphate catalysed polymerisations, polymerisations and related condensations involving sugar conversion to 5-hydroxymethyl furfural first, sugar polymerisation with malondialdehyde generated "in situ."

Three examples while not in themselves being restrictive will illustrate these polymerisations:

EXAMPLE 8

Friedel-Crafts polymerisation

Sucrose (250 mg.) was dissolved in diethylene glycol monomethyl ether (2 ml.) by heating with agitation. On addition of catalytic quantities of aluminium chloride or boron trifluoride, a vigorous reaction ensued, and polymerisation of the sucrose occurred. The resultant solution was dark orange-brown and an insoluble material precipitated on dilution with water. The reaction mixture itself was found to be useful as a timber finishing preparation, giving excellent coverage and uniform staining over a wide concentration range.

The solvent did not lift the grain at all.

EXAMPLE 9

Sucrose-phenol-formaldehyde reactions

Phenol (18.8 g.) was dissolved in tetrahydrofurfuryl alcohol (cs. 100 ml.) and sodium (4.6 g.) was added. The sodium phenate formed a very viscous solution, but no solid precipitated out. Sucrose (34.2 g.) was powdered and intimately mixed with paraformaldehyde (13.5 g.) and the mixture added portionwise to the vigorously stirred sodium phenate solution at 150° C. The solution darkened considerably on addition, and towards the ends of the addition, formaldehyde was liberated from the reaction mixture. Stirring was continued for 45 minutes after addition was complete.

The reaction mixture was poured into water (500 ml.) containing concentrated hydrochloric acid (25 ml.), and the tan coloured precipitate ether extracted. The ether extract was washed with water and dried over anhydrous sodium sulphate before evaporation. The product was a dark brown viscous liquid from which further volatile material could be removed by distillation. The resultant viscous liquid solidified on cooling or pouring into chloroform, benzene or petroleum ether.

The product was a vitreous, black, brittle resin which softened on heating to 100–120° C. It was very soluble in acetone and ethyl acetate, moderately soluble in ethanol and partly soluble in chloroform, but completely insoluble in benzene, petroleum ether and water.

EXAMPLE 10

The reactant molar ratios in the previous example were sucrose-1; phenol-2; formaldehyde-4.4; sodium-2. In the present example these were altered to sucrose-1; phenol-3.5; formaldehyde-9; sodium-2.

Phenol (6.7 g.) was reacted with sodium (0.93 g.) in diethylene glycol monomethyl ether (40 ml.). The mixture was heated to 140° C., an intimate mixture of sucrose (6.9 g.) and paraformaldehyde (5.5 g.) rapidly added and heating with stirring continued for ten minutes. The mixture was acidified and the ether soluble oil cured to an orange resin on heating at 140° C. for 30 minutes.

The resins produced in Examples 9 and 10 have useful properties for wood staining and finishing when dissolved in a glycol ether or ethyl acetate.

(E) The preparations of heterocyclic compounds, for example:

Productions of ethers of the solvent and 5-hydroxymethylfurfural,

Production of monoethers of the solvent and either 2,5-dihydroxymethyltetrahydrofuran, or 2,5-dihydroxymethylfuran.

The preparation of furan ethers given hereafter by way of examples:

EXAMPLE 11

Fructose (30.0 g.) was dissolved in diethylene glycol monomethyl ether (100 ml.) by heating to 130° C. Benzene (50 ml.) and p-toluene sulphonic acid (500 mg.) were added and the reaction continued at 150° C. until entrainment of water was completed. Under the above conditions this took three to three and a half hours. The reaction mixture was analysed for the methyl carbitol ether of 5-hydroxymethylfurfural and related chromophores by ultra-violet absorption spectroscopy, which showed an inter-conversion of 75%. This could be raised by 5–10% by hydrolysis of the diethyleneglycol monomethyl ether acetal formed during the reaction. Dilution of the reaction mixture with water and extraction with ether until the residue was exhausted of product (by U.V. spectroscopy), drying over a suitable anhydrous drying agent such as sodium sulphate, evaporation and distillation under reduced pressure yielded the required compound in 65% yield Bpt. (boiling point)$_{0.1\ mm.\ mercury}$=118–120° C. As a by-product, the bis-ether derived by self-condensation of 5-hydroxymethylfurfural was formed in 10% yield. This compound was identical with material known in the art.

Analogous results were obtained by using ethylene glycol monomethyl ether as the solvent. The compound obtained in this preparation had a $$Bpt._{0.15\ mm.\ mercury}=88\text{–}90°\ C.$$

and a $Bpt._{0.1\ mm.\ mercury}=84\text{–}86°\ C.$

EXAMPLE 12

Fructose (30.0 g.) was dissolved in tetra-hydrofurfuryl alcohol (100 ml.) at 150° C. in an entrainment apparatus. The reaction was initiated by adding p-toluene sulphonic acid (500 mg.) and benzene (50 ml.) was added to effect entrainment of the liberated water. The reaction was complete after heating for three hours at 130° C. The reaction mixture was poured into water and the product extracted by either ethyl acetate, benzene or chloroform. The extract was evaporated, and the residue extracted by ether. The ether extract was dried as before and distilled under reduced pressure ot yield the tetrahydrofurfuryl ether of 5-hydroxymethylfurfural (70%)

(Bpt. 0.15 mm.=114–118° C.)

and the bis-ether derived by self-condensation of 5-hydroxymethylfurfural (10%).

Substitution of 5-hydroxymethylfurfural (21 g.) for the fructose in Examples 11 and 12 gave an identical result.

EXAMPLE 13

Partial reduction of the ether of ethylene glycol monomethyl ether and 5-hydroxymethylfurfural The aldehyde group of the ether of ethylene glycol monomethyl ether and 5-hydroxymethylfurfural may be reduced more readily than the ring system, by a variety of reduction methods known in the art.

In this example this ether was dissolved in ethylene glycol monomethyl ether and reduced at atmospheric pressure or under an increased pressure of hydrogen in the presence of Raney nickel catalyst until one molecular proportion of hydrogen had been taken up. The catalyst was filtered off and the reaction mixture concentrated and distilled. An essentially quantitative yield of the monoether of ethylene glycol monomethyl ether and 2,5-dihydroxymethyl furan (Bpt. 7.0 mm. mercury=138–140° C.) was obtained.

The aldehyde groups of ethers derived from 5-hydroxy methylfurfural and diethylene glycol monomethyl ether or tetrahydrofurfuryl alcohol could be reduced with equal facility in any of the solvents claimed as reaction media. More vigorous reduction conditions resulted on the uptake of three molecular proportions of hydrogen with complete reduction of the ring system as well as the aldehyde group.

(F) N-glycoside formation as, for example, described in the following example:

EXAMPLE 14

N-glycoside formation

D (+) glucose (9.2 g.) was dissolved in ethylene glycol monomethyl ether (25 ml.) containing a small quantity of water (1.5 ml.), i.e., less than 5% by weight of the total mixture, by heating and swirling, n-dodecylamine (4.5 g.) was added to this mixture at ambient temperature, and the mixture was agitated until the amine had dissolved. Separation of the product from the mixture was assisted by adding water (16.5 ml.). The required product separated after several hours. Heat reversible gel formation sometimes resulted, and the product was obtained from such gels by treatment with a little ethanol and warming, followed by seeding and cooling to 20° C.

Highly pure product was obtained by filtering the solution while cold, and repeating the alcohol treatment on the product so obtained.

The pure product had a melting point 103–104° C. and analysed correctly for $C_{18}H_{37}NO_5$.

We claim:

1. A process for carrying out reactions involving a material selected from the group consisting of sugars and sugar derivatives, said process consisting of dissolving said material at temperatures between 50 degrees centigrade and 200 degrees centigrade in a substantially anhydrous water-miscible high-boiling monohydric alcohol containing the structural grouping

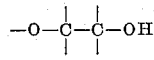

and thereafter reacting the resultant solution with a reagent which reacts with said material at temperatures beween 0 degrees centigrade and 200 degrees centigrade.

2. A process according to claim 1 in which the sugar is sucrose.

3. A process according to claim 1 in which the sugar is a monosaccharide.

4. A process according to claim 1 in which the sugar is glucose and the reagent is a reducing agent.

5. A process according to claim 1 in which the sugar is glucose and the reagent is an oxidising agent.

6. A process according to claim 1 in which the sugar is fructose and the reagent is a reducing agent.

7. A process according to claim 1 in which the reagent is a dehydrating catalyst, the reactant is selected from the group consisting of ketohexose and polymers thereof and the product is 5-hydroxymethylfurfural.

8. A process according to claim 7 in which the reaction is carried on for a prolonged period to produce a further condensation product, said product being an ether derivative of 5-hydroxymethylfurfural and the solvent alcohol.

9. A process according to claim 8 including the further step of reducing the aldehyde group of said ether of 5-hydroxymethylfurfural to a monoether of 2,5-dihydroxymethylfuran.

10. A process according to claim 8 including the further step of reducing the aldehyde group and the ring system of said ether of 5-hydroxymethylfurfural to a monoether derivative of 2,5-dihydroxymethyltetrahydrofuran.

11. A process for carrying out reactions involving a material selected from the group consisting of sugars and sugar derivatives, said process consisting of dissolving said material at temperatures between 50 degrees centigrade and 200 degrees centigrade in a substantially anhydrous alcohol and thereafter reacting the resultant solution with a reagent which reacts with said material at temperatures between 0 degree centigrade and 200 degrees centigrade, said alcohol being selected from the group consisting of ethylene glycol monoalkyl ether, ethylene glycol monoester, diethylene glycol monoalkyl ether, diethylene glycol and 2-hydroxymethyl tetrahydrofurfuryl alcohol and 2-hydroxymethyl tetrahydropyran.

12. A process according to claim 11 in which the alcohol is ethylene glycol monoethyl ether.

13. A process according to claim 11 in which the alcohol is diethylene glycol monomethyl ether.

14. A process according to claim 1 in which the sugar derivative is a sugar alcohol, the reagent is a dehydrating catalyst consisting of an acid, and the product is an anhydro-sugar alcohol.

15. A process according to claim 1 in which the sugar derivative is a sugar ether, the reagent is an oxidising agent selected from the group consisting of lead tetra-acetate and periodates, and the product is a dialdehyde derived by oxidative fission of the sugar ring system.

16. A process according to claim 15 in which said dialdehyde derivative is further reacted with nitromethane in the presence of a base to give a 3-nitro-3-dropyran.

17. A process for the catalytic reduction of D(+) glucose consisting of dissolving said glucose in ethylene glycol monomethyl ether containing concentrated hy-solution to about 80 degrees centigrade, adding Raney nickel catalyst to the solution and hydrogenating the sugar, filtering to remove the catalyst, and cooling the filtrate to 0 degree centigrade to crystallise D-sorbitol hemi-hydrate.

18. A process of mercaptal formation from D(+) glucose consisting of dissolving said glucose in ethylene glycol monomethyl ether containing concentrated hydrochloric acid, cooling the solution to 0 degree centigrade, adding n-butyl mercaptan, shaking for about 30 minutes, cooling again and adding ice-water to precipitate the mercaptal.

19. A process for the oxidation of glucose consisting of dissolving said glucose in diethylene glycol monomethyl ether, treating said solution with bromine for 30 minutes at a temperature of 70 degrees centigrade and precipitating the oxidation product with ether.

20. A process for the condensation of D-hydroxymethyl-D′-methoxydiglycolic aldehyde with nitromethane consisting of dissolving said aldehyde in ethylene glycol monomethyl ether with warming, adding nitromethane, cooling the solution, adding dropwise thereto with swirling a solution of sodium betamethoxy ethoxide in ethylene glycol monomethyl ether, maintaining said mixture in an ice bath for 15 minutes and concentrating said mixture under vacuum at a temperature below 20 degrees centigrade.

21. A process for the periodate oxidation of α-methyl-D-gluco-pyranoside consisting of dissolving said glycopyranoside in ethylene glycol monomethyl ether with warming, cooling the solution to 0 degree centigrade, adding thereto with vigorous swirling slightly more than two molar proportions of periodic acid over a period of 15 minutes, and allowing the solution to react at room temperature for 48 hours, treating the reaction solution with sodium carbonate, filtering the solution and concentrating the filtrate to an almost colourless oil consisting of D-hydroxymethyl-D′-methoxydiglycolic aldehyde.

22. A process for the preparation of 5-hydroxymethylfurfural consisting of dissolving fructose in diethylene glycol monomethyl ether, adding hydrochloric acid and heating the solution to boiling point for two seconds.

23. A process for the preparation of 3,4-dihydroxytetrahydrofuran consisting of dissolving erythritol in equal amounts of anhydrous tetrahydrofurfuryl alcohol and benzene, refluxing said solution in the presence of an acid catalyst until water entrainment is completed and distilling the reaction solution under vacuum.

24. A process for the polymerisation of sucrose consisting of dissolving said sucrose in diethylene glycol monomethyl ether under heat and agitation, and adding a catalyst selected from aluminium chloride and boron trifluoride.

25. A process for the preparation of sucrose/phenol-formaldehyde resin consisting of reacting sodium with phenol dissolved in a solvent selected from the group consisting of tetrahydrofurfuryl alcohol and diethylene glycol monomethyl ether, adding thereto with stirring at elevated temperature an intimate mixture of sucrose and paraformaldehyde, acidifying the reaction mixture, extracting the precipitate with ether, evaporating ether from the extract and solidifying the residue.

26. A process for the preparation of furan ethers from fructose consisting of dissolving said fructose at a temperature of 130 degrees centigrade in diethylene glycol monomethyl ether, adding benzene and p-toluene sulphonic acid, maintaining the solution at 130 degrees centigrade until entrainment of water is completed, diluting the reaction mixture thus obtained with water, extracting with ether, drying the extract over an anhydrous drying agent, evaporating the ether and distilling the residue under reduced pressure.

27. A process for the preparation of the tetrahydrofurfuryl ether of 5-hydroxymethylfurfural from fructose consisting of dissolving said fructose in tetrahydrofurfuryl alcohol at a temperature of 130 degrees centigrade, adding p-toluene sulphonic acid to initiate reaction, adding benzene to effect entrainment of water, and maintaining the reaction mixture at a temperature of 130 degrees centigrade for three hours, pouring the reaction mixture into water, extracting the product with a suitable solvent and evaporating to obtain a residue, extracting said residue with ether, drying the extract over an anhydrous drying agent, evaporating the ether and distilling the product under reduced pressure.

28. A process for the partial reduction of the ether of ethylene glycol monomethyl ether and 5-hydroxymethylfurfural consisting of dissolving said ether in ethylene glycol monomethyl ether, hydrogenating the mixture in the presence of Raney nickel catalyst until one molecular proportion of hydrogen has been taken up, filtering off the catalyst, concentrating and distilling the reduction product to obtain the monoether of ethylene glycol monomethyl ether and 2,5-dihydroxymethyl furan.

29. A process for the formation of N-glycoside from D(+)glucose consisting of dissolving said glucose in ethylene glycol monomethyl ether containing water in amount less than 5 percent by weight of the total mixture, adding n-dodecylamine to the mixture at ambient temperature with shaking, separating the product from the mixture by adding water to the reaction mixture and filtering off the precipitated N-glycoside.

No references cited.

WILLIAM H. SHORT, *Primary Examiner.*

J. NORRIS, *Assistant Examiner.*